May 1, 1923.
G. R. GOIN ET AL
FILLER AND GAUGE
Filed March 24, 1919
1,453,668
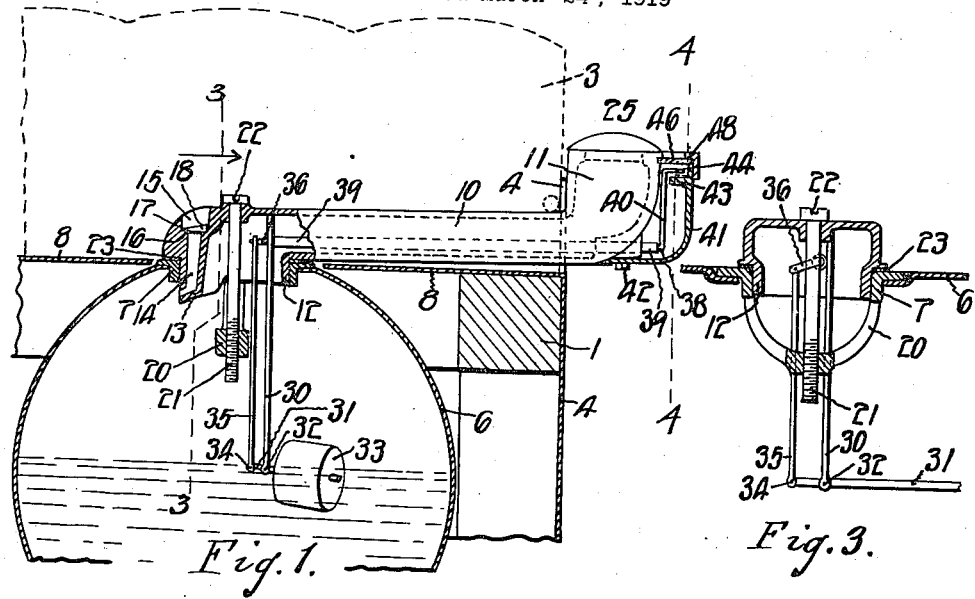
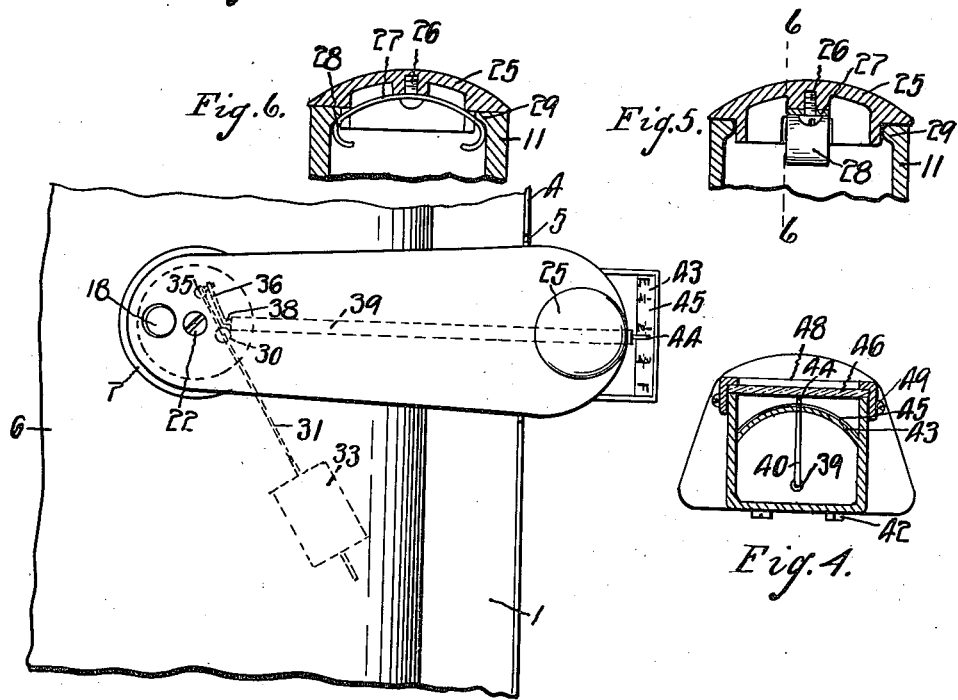
Inventor
George R. Goin and
Rexford E. Hite,
By Pegelow & Spencer
Attorneys Patented May 1, 1923.

1,453,668

UNITED STATES PATENT OFFICE.

GEORGE R. GOIN AND REXFORD E. HITE, OF HIGHLAND PARK, MICHIGAN; SAID GOIN ASSIGNOR TO SAID HITE.

FILLER AND GAUGE.

Application filed March 24, 1919. Serial No. 284,739.

*To all whom it may concern:*

Be it known that we, GEORGE R. GOIN and REXFORD E. HITE, citizens of the United States, and residing at Highland Park, county of Wayne, and State of Michigan, have invented a new and Improved Filler and Gauge, of which the following is a specification.

This invention relates to a device whereby that type of tank which is located beneath the seat of a motor vehicle may be readily filled and the depth of liquid therein observed without the necessity for removing the seat cushion. We are aware that an effort has been made to provide a filler for such tank installations, but so far as we are informed such devices have been objectionable in that they failed to provide for rapid filling and were subject to blubbering and overflow.

The invention consists in a hollow member adapted to be permanently secured in pouring relation to the usual tank opening and arranged to extend forwardly therefrom beyond the edge of the seat to there receive the filling nozzle, said member also having provision for the ready escape of air from the tank through a passage other than that through which the fuel flows.

Again, the invention consists in a filling device of the nature stated wherein the depth of the liquid in the tank is constantly made apparent by an indicator arm positioned in front of the seat and in proximity to the opening into which the nozzle is inserted.

The invention also consists in certain elements whereby the filling device is clamped onto the filling opening in the tank.

The invention further consists in various other details of construction shown, described and particularly pointed out by the claims.

In the drawings, Fig. 1 is a fragmentary longitudinal section of a vehicle, showing one embodiment of the invention. Fig. 2 is a fragmentary plan view corresponding thereto, the plate 8 being omitted. Figs. 3 and 4 are sections on lines 3—3 and 4—4 of Fig. 1. Fig. 5 is a fragmentary vertical section taken through the snout and attendant parts. Fig. 6 is a section on line 6—6 of Fig. 5.

The seat structure may vary widely in detail and in the conventional form shown includes the wooden front frame bar 1 that extends transversely of the vehicle and is surmounted by the upholstered spring seat bottom 3 which appears in dashed lines. On its front face the seat frame is concealed by the sheet metal plate 4 that extends upwardly somewhat beyond the bar 1 and is notched at 5; and within the seat is a sheet metal tank 6 the construction of which may vary widely in any event. This tank has an opening in its upper side preferably formed by the internally threaded reinforcing collar or boss 7. As the cars come from the factory the opening into the tank is positioned beneath a corresponding opening in the sheet metal plate 8 (on which the seat bottom 3 directly rests) and is normally closed by a plug, not shown, and it is necessary to remove the seat bottom for filling purposes and for the purpose of ascertaining the depth of the fuel.

In order to avoid thus removing the seat, we provide a hollow filler 10—the width of which is preferably considerably greater than the depth—having a downturned discharge opening registering with the filling opening of the tank and also having an upturned filling snout 11 just forward of the front edge of the seat, it being understood that the filler passes through the notch 5. The discharge opening of the filler is preferably formed by a substantially annular wall or rib 12 which fits into the collar 7, this wall being provided with a downward extension 13 on the side nearest the rear of the seat, said extension having an air vent 14. It will be understood that the vent is of size sufficient to permit the escape of air rapidly enough to accommodate the fuel discharge of the ordinary hose nozzles used in service stations. For the purpose of preventing evaporation of the fuel, the upper end portion 15 of the vent is shaped to form a valve seat 16 on which a screen 17 and a light disk valve 18, overweighted at one side—as by means of a drop of solder—rests. It is evident that the vent 14, the entrance to which is on the outer side of the extension 13, is fully protected from liquid flowing into the tank.

Various means may be provided for clamping the filler on the tank; that preferred is shown, and comprises a bridge member 20 of considerable depth arranged to bear on diametrically opposite points on the lower edge of the wall 7 and tapped centrally to receive a screw 21 the head of which is accessible from the top of the filler. By tilting the bridge it may be inserted through the tank opening, and the screw may then be tightened, thus drawing the ends of the bridge up against the lower face of the collar or ring 7 and forcing the filler down onto the felt sealing washer 23 or the equivalent which is interposed between it and the upper surface of said ring.

A readily detachable cap 25 is provided for the upper end of the snout 11, this cap preferably having attached thereto by a screw 26 a flat spring 27 including the reversely bent or inturned ends 28 adapted to seat under an annular ledge 29 on the snout. This cap may be instantly removed yet is normally held snugly on its seat by the spring: Other caps might, of course, be used.

Threaded or riveted into the upper wall of the filler and projecting downwardly through the discharge opening is a post 30, in the lower end of which a float carrying arm 31 is pivoted at 32, said arm being provided at one end with the float 33 and having its other end pivoted at 34 to the upwardly extending link 35. The latter is pivoted to the crank 36 on the shaft 38 which is preferably supported throughout its length in the tube 39 that projects through the front wall of the filler and is there provided with the indicator arm 40. The tube or bearing 39 may be soldered or otherwise secured in the filler and to the post 30 in any suitable manner. The parts 30—31—35—36—38—40 are all preferably formed from wire stock, it being understood that the crank 36 is bent after the shaft is inserted in its bearing.

In order to protect the arm 40, the housing element 41, which fits the outer wall of the snout 11 and is secured in place by the screws 42, is provided, this element including the inwardly extending arc-shaped ledge 43 over which the end 44 of the arm 40 sweeps. It is evident that the graduations on the paper strip 45, Fig. 2, may be read by the driver upon looking downwardly through the transparent panel 46, preferably glass, which is protected by the slotted cover 48, the latter being held in place by the screws 49. In this manner the indicator is not only fully protected from blows, but provision is made for readily adjusting the indicator arm to the graduated dial, since it is only necessary to remove the cover and bend the arm.

We are aware that various changes may be made in the details of the several parts and that the element 10 may be made up of sheet metal rather than of the cast material shown. It is conceivable also that the indicating mechanism might be omitted; however, we prefer to use the construction shown since it in our judgment best carries out the purposes of the invention.

We claim:—

1. In a tank filler, a filling element terminating in a downturned end portion received in a filling opening for a tank and forming a tight joint therewith, the wall of the end portion forming a vent passage and being shaped to prevent liquid being poured into the tank from entering said vent passage in the normal filling operation, said vent communicating with the atmosphere substantially directly above the filling opening and being provided with an enlarged outlet, and an outwardly opening valve loosely positioned in said outlet.

2. In a device of the class described, a tank housed within a portion of a vehicle; a filling member prolonged with respect to the tank to dispose the outer end of said member externally of said portion of the vehicle, the inner end of the filling member being downturned and being mounted in the tank, said end of the filling member having a substantially vertical air vent external to the bore of said end and discharging adjacent to said end, the inner end of the vent opening laterally through the side wall of the downturned inner end of the filling member whereby inflowing liquid traversing the delivery member will be prevented from entering the vent with the outflowing air.

3. In a tank filler, a filling element having a filling channel extending substantially horizontally toward the tank and terminating in a downward end portion adapted to be inserted into the filling opening of a tank and forming an outlet from the filling channel, said downturned end portion having an air vent partitioned from the outlet of the filling channel and provided with an outlet situated at a point remote from the inlet of the said filling channel and an outwardly opening valve loosely positioned adjacent the said outlet, substantially as set forth.

4. In a tank filler, a filling element having a filling channel extending substantially horizontally from the point of inlet toward the tank and terminating in a downturned end portion adapted to be inserted into the filling opening of a tank and forming an outlet from the filling channel, said downturned end portion having an air vent separated from the said outlet and having its inlet end bent away from the direction of flow of fluid entering the tank through the said outlet of the filling channel, substantially as set forth.

5. A tank filler comprising a substantially horizontal tube extending from a tank beneath the seat of an automobile to a point beyond the seat, said tube having an upward bend at the outer end and a downwardly bent part at the inner end to fit in the filling opening of the tank, said tube having at its inner end a thickened portion, an air vent extending upward through the said thickened portion and a bolt extending downward through the tube, and a yoke within the tank straddling the filling opening and engaged by the bolt to hold the tube in place, substantially as set forth.

GEORGE R. GOIN.
REXFORD E. HITE.